(12) United States Patent
Chen (10) Patent No.: US 7,595,718 B2
(45) Date of Patent: Sep. 29, 2009

(54) ANTITHEFT SYSTEM WITH CLIP-ON WIRELESS KEYPAD

(76) Inventor: Tse Hsing Chen, 14 Fl., No. 736 Chung-Cheng Rd., Chung-Ho City, Taipei Hsien (TW) 23511

( * ) Notice: Subject to any disclaimer, the term of this patent is extended or adjusted under 35 U.S.C. 154(b) by 359 days.

(21) Appl. No.: 11/699,410

(22) Filed: Jan. 30, 2007

(65) Prior Publication Data

US 2008/0180231 A1 Jul. 31, 2008

(51) Int. Cl.
*B60R 25/10* (2006.01)
(52) U.S. Cl. .............. 340/426.1; 340/426.13; 340/426.28; 340/426.36
(58) Field of Classification Search ........... 340/426.1
See application file for complete search history.

(56) References Cited

U.S. PATENT DOCUMENTS

| | | | |
|---|---|---|---|
| 7,362,211 B2 * | 4/2008 | Huntzicker | 340/5.64 |
| 7,400,232 B2 * | 7/2008 | Reichling et al. | 340/426.36 |
| 2006/0186987 A1 * | 8/2006 | Wilkins | 340/5.53 |
| 2006/0238385 A1 * | 10/2006 | Steenwyk et al. | 341/33 |

* cited by examiner

*Primary Examiner*—Toan N Pham
*Assistant Examiner*—Kerri McNally
(74) *Attorney, Agent, or Firm*—Bacon & Thomas PLLC (57) ABSTRACT

An antitheft system includes a main controller mounted in a car for controlling an overall operation of the antitheft system, and a wireless keypad provided on a front side with numbered keys, and on a rear side with a clip. The wireless keypad may be attached to a car door edge of all versions of different brands of cars via the clip without the risk of separating from the door easily. The wireless keypad also allows a user to enter and transmit a code to the main controller to release or enable the antitheft system just beside the car, and is therefore a humanized design.

4 Claims, 10 Drawing Sheets

ANTITHEFT SYSTEM WITH CLIP-ON WIRELESS KEYPAD

FIELD OF THE INVENTION

The present invention relates to a novel auto antitheft system, and more particularly to a humanized antitheft system having a wireless keypad that may be clipped to a door edge of all versions of cars via a clip provided on a rear side of the wireless keypad, so that a user may conveniently use the wireless keypad just beside a car to enter and transmit a code to a main controller mounted in the car to release or enable the antitheft system.

BACKGROUND OF THE INVENTION

An automobile is an important traffic means in the modern society. It is a good thing to buy and own a car, and to conveniently go any place by driving. However, almost all the car owners have the bothersome problem of guarding the car against theft. A car thief would try different ways to steal a car, such as destroying the car lock, preparing a master key, destroying the door handle, driving away a car having the key left therein, etc. According to official investigations, an experienced thief needs only five minutes to steal a car. However, most car thieves would not take a risk and spend a lot of time to steal a car having an antitheft system mounted thereon.

Figure 8:
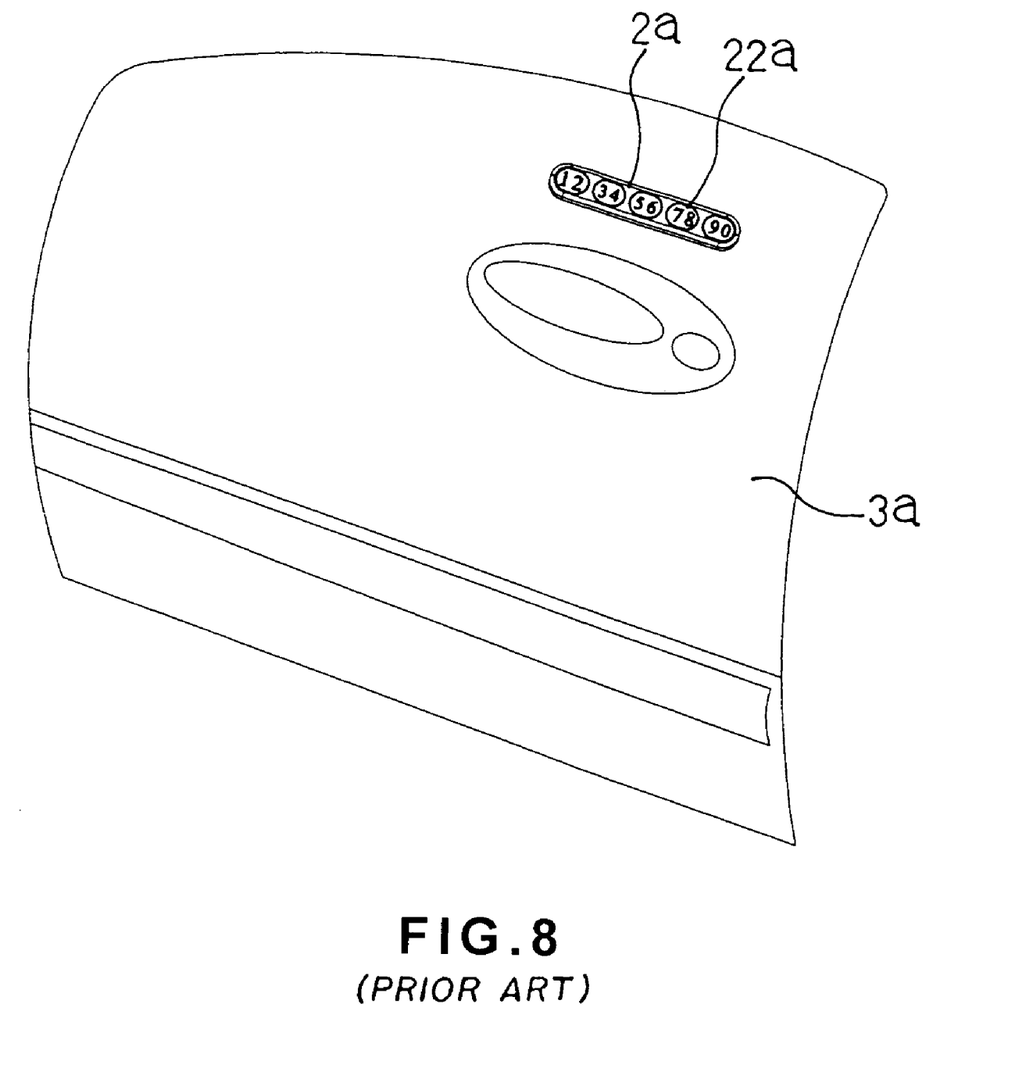
FIG. 8 shows an original equipment antitheft wireless keypad mounted on a car door.

Therefore, there are various types of auto antitheft systems developed and available in the market, and these antitheft systems generally produce a deterrent effect by emitting a warning sound at the instant the car is invaded by a thief. The currently available auto antitheft systems are different in their performance and effect. The auto antitheft systems and remote-controlled power locks in early stages are generally controlled using a remote controller. However, an advanced original equipment antitheft system for car as shown in FIG. 6 has been developed to save a user the trouble of carrying a remote controller or carelessly leaving the remote controller or a key in the car. In the antitheft system shown in FIG. 8, a numeral keypad 2a is provided near a door handle 3a. A user may conveniently enter a code by pressing numbered keys 22a on the keypad 2a to release or enable the auto antitheft system without the need of carrying the remote controller. The auto antitheft system with the keypad is therefore a convenient, advanced, and humanized design.

While it is very easy to provide such keypad on the door of a car as original equipment thereof, it is quite troublesome to additionally mount the keypad on the door of a car as an after-service because it is necessary to drill a hole on the car door for mounting the keypad, and then electrically connect the keypad to a main controller mounted in the car. And, most car owners are not willing to drill holes on their new cars for mounting the keypad.

A currently available solution best for this problem is to bond a wireless keypad to a car door, so as to avoid drilling on the car door and therefore attract more customers to mount this type of antitheft system. The wireless keypad is received in a case and internally provided with a key circuit, a battery, and a wireless transmission circuit. However, the wireless keypad bonded to the car door tends to be easily stolen by a thief or separated from the car door due to car washing or vibration in driving.

It is therefore tried by the inventor to develop an antitheft system with clip-on wireless keypad to overcome the above-mentioned problems.

SUMMARY OF THE INVENTION

An antitheft system with clip-on wireless keypad according to the present invention includes a main controller mounted in a car for controlling an overall operation of the antitheft system, and a wireless keypad provided on a front side with numbered keys and on a rear side with a clip. The wireless keypad may be attached to a car door edge of all versions of different brands of cars via the clip without the risk of separating from the door easily. The wireless keypad also allows a user to enter and transmit a code to the main controller to release or enable the antitheft system just beside the car, and is therefore a humanized design.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIG. 4-1A is a front perspective view of a third embodiment of the clip-on wireless keypad included in the antitheft system of the present invention;

FIG. 4-1B is a side perspective view of the clip-on wireless keypad of FIG. 4-1A;

FIG. 5-1 shows the mounting of the clip-on wireless keypad of FIG. 4-1 to a car door edge;

FIG. 5-1A is a partially enlarged view of FIG. 5-1;

FIGS. 6A1 and 6A2 are front perspective and rear plan views, respectively, of a fourth embodiment of the clip-on wireless keypad included in the antitheft system of the present invention, wherein the wireless keypad has an angularly adjustable clip;

FIGS. 6B1 and 6B2 are front perspective and rear plan views, respectively, showing the clip of the wireless keypad of FIGS. 6A1 and 6A2 is turned leftward relative to the wireless keypad by an angle;

FIGS. 6C1 and 6C2 are front perspective and rear plan views, respectively, showing the clip of the wireless keypad of FIGS. 6A1 and 6A2 is turned rightward relative to the wireless keypad by an angle;

DETAILED DESCRIPTION OF THE PREFERRED EMBODIMENTS

Figure 1:
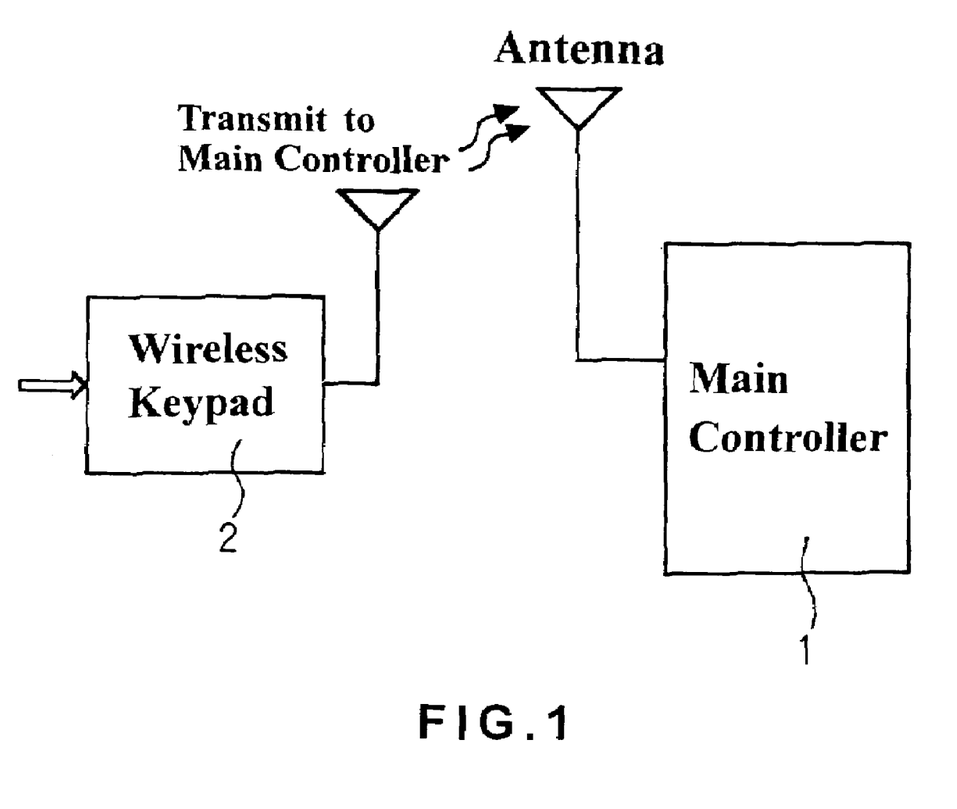
FIG. 1 is a block diagram of an antitheft system with clip-on wireless keypad according to the present invention.
Figures 1A, 4:
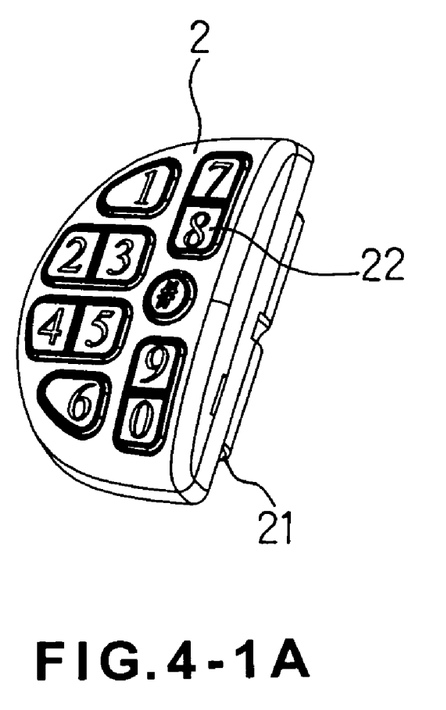
FIG. 4A is a front perspective view of a second embodiment of the clip-on wireless keypad included in the antitheft system of the present invention.
FIG. 4B is a side perspective view of the clip-on wireless keypad of FIG. 4A.
Figures 1A, 5, 51:
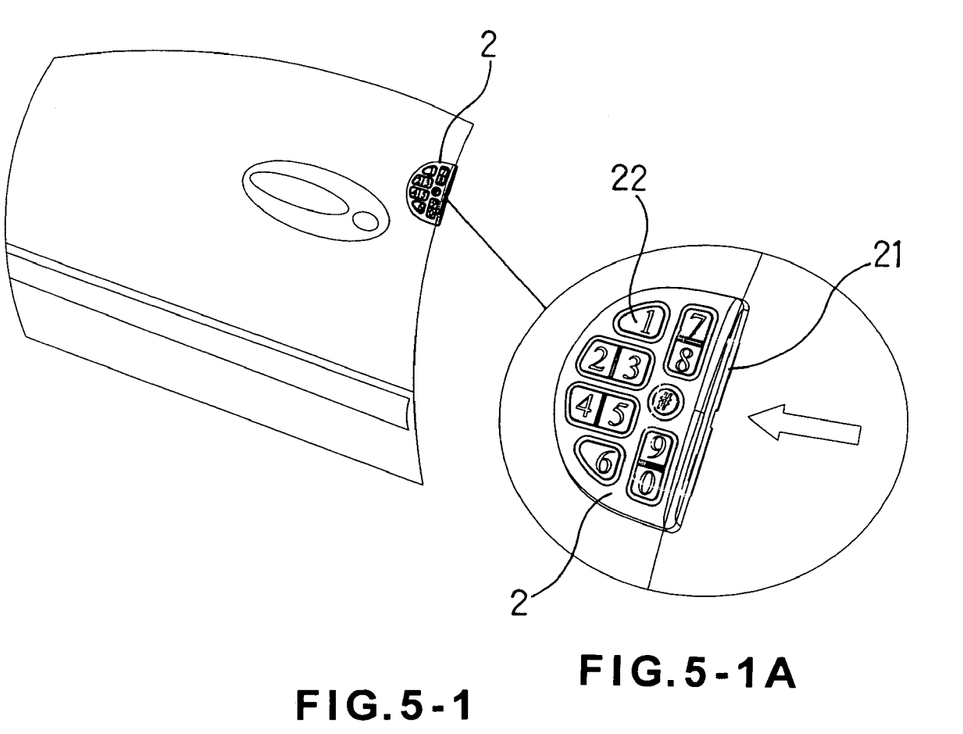
Figures 1B, 4:
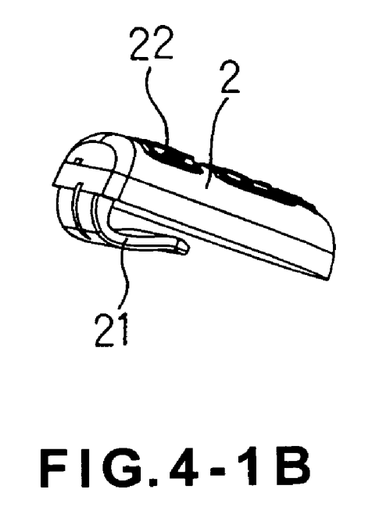

Please refer to FIG. 1 that is a block diagram of an antitheft system with clip-on wireless keypad according to the present invention. As shown, the antitheft system of FIG. 1 includes a main controller 1 mounted in a car for controlling an overall operation of the anti-theft system and the door locks of the car; and a wireless keypad 2 internally provided with a keypad circuit, a battery, and a wireless transmission circuit (not shown), and externally provided with a clip 21 for connecting the wireless keypad 2 to an edge of a car door 3.

Figure 2A:
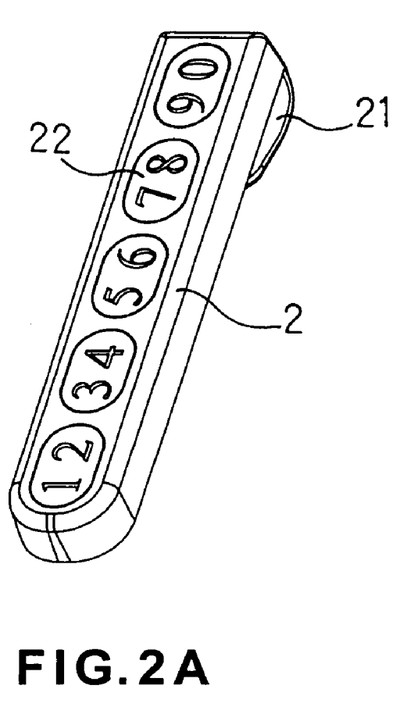
FIG. 2A is a front perspective view of a first embodiment of the clip-on wireless keypad included in the antitheft system of the present invention.
Figure 2B:
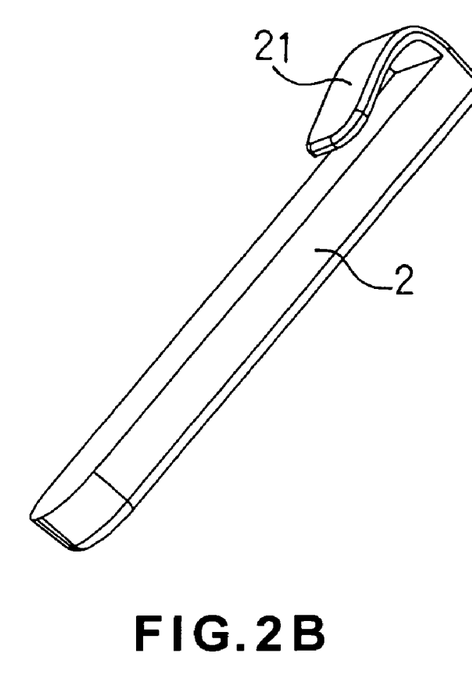
FIG. 2B is a rear perspective view of the lip-on wireless keypad of FIG. 2A.
Figure 4A:
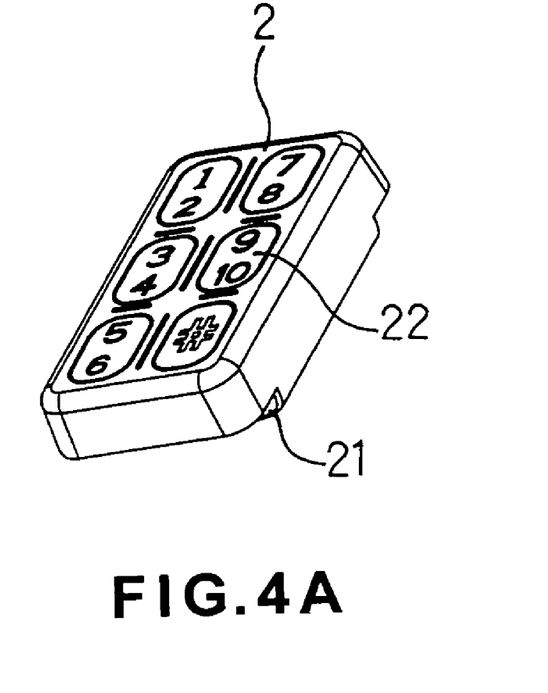
Figure 4B:
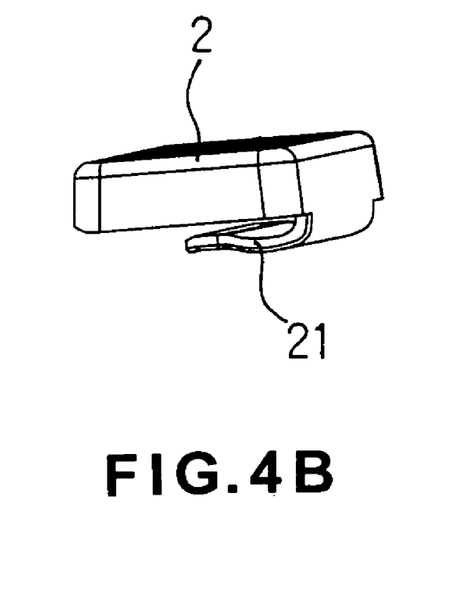
Figures 5, 5A:
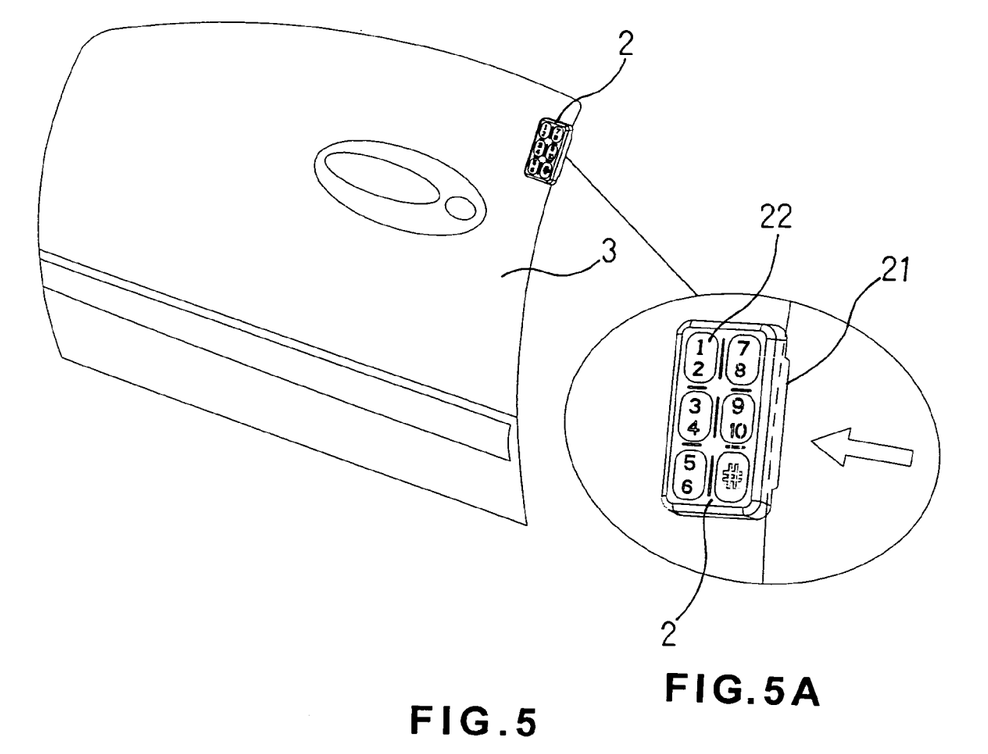
FIG. 5 shows the mounting of the clip-on wireless keypad of FIG. 4 to a car door edge.
FIG. 5A is a partially enlarged view of FIG. 5.

FIGS. 2A and 2B are front and rear perspective views, respectively, of the wireless keypad 2 according to a first embodiment of thereof. In this first embodiment, the wireless keypad 2 has an elongate body. On a front side of the elongate body of the wireless keypad 2, there are provided with a plurality of numbered keys 22. The clip 21 is located at a rear side of the wireless keypad 2. Of course, the wireless keypad 2 may be of any other shape. FIGS. 4A and 4B are front and side perspective views, respectively, of a second embodiment of the wireless keypad 2 having a short rectangular body with the numbered keys 22 provided on a front side thereof and the clip 21 on a rear side thereof. FIGS. 4-1A and 4-1B are front and side perspective views, respectively, of a third embodiment of the wireless keypad 2 having a substantially semicircular body with the numbered keys 22 provided on a front side thereof and the clip 21 on a rear side thereof.

Figures 3, 3A:
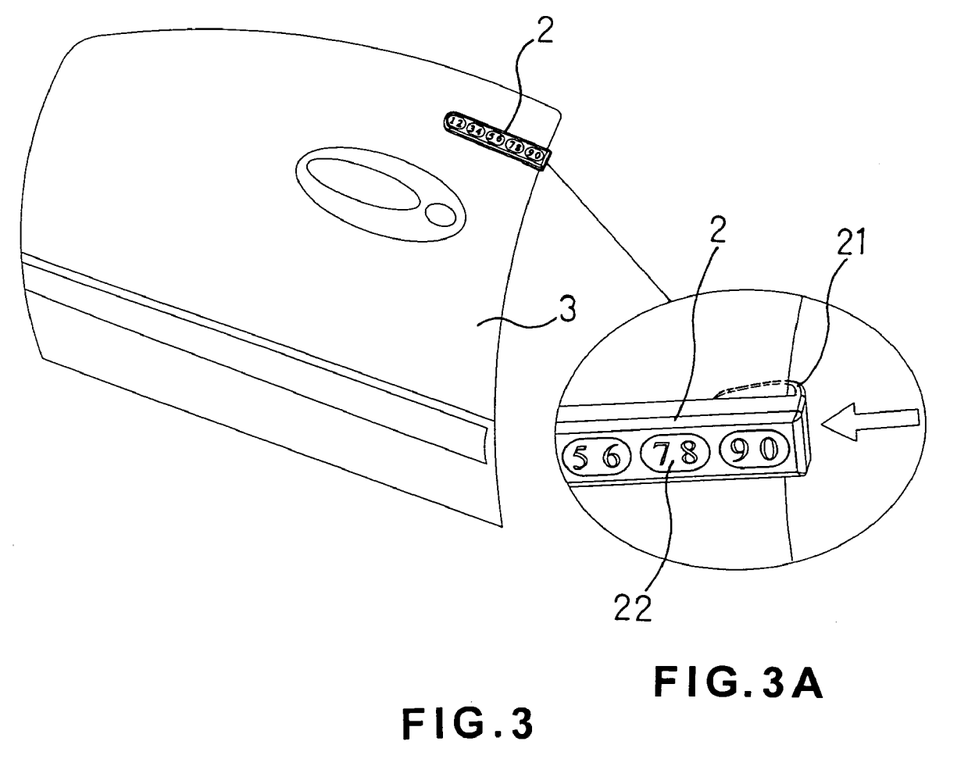
FIG. 3 shows the mounting of the clip-on wireless keypad of FIG. 2 to a car door edge.
FIG. 3A is a partially enlarged view of FIG. 3.

Please refer to FIGS. 3, 3A; 5, 5A; and 5-1, 5-1A. The wireless keypad 2 is designed for externally attaching to the edge of the car door 3 via the clip 21, and can therefore be mounted to all versions of different brands of cars without the need of drilling or wiring. To mount the wireless keypad 2 to the car door 3, a bonding agent is first applied to the rear side of the body of the wireless keypad 2 to fixedly bond the wireless keypad 2 to a desired position near the door edge. With the clip 21, the wireless keypad 2 may be more firmly held to the car door 3 without the risk of separating from the car door 3 due to vibration during driving or car washing. Since the clip 21 has a size larger than the gap between front and rear doors or the gap between the door and door frame, it is uneasy to externally detach the clip-on wireless keypad 2 from the car door 3 when door is closed.

Figure 6A:
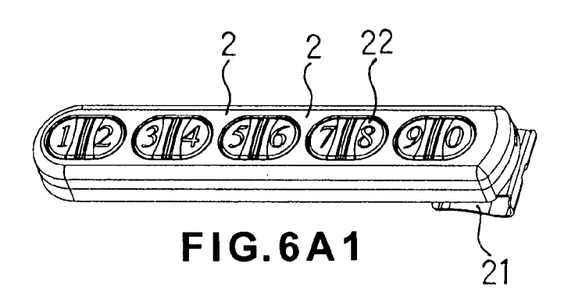
Figure 6A:
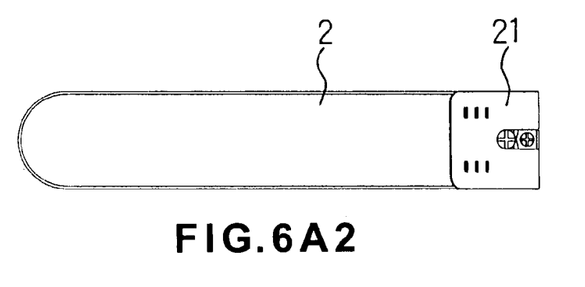
Figure 6B:
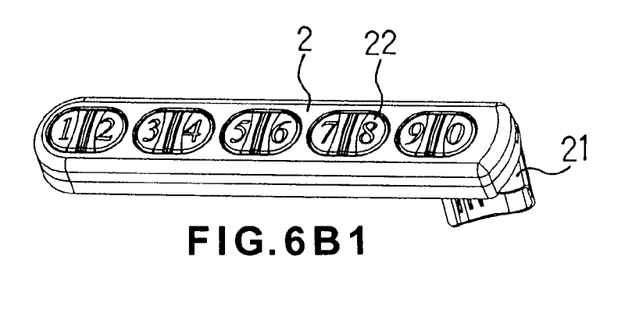
Figure 6B:
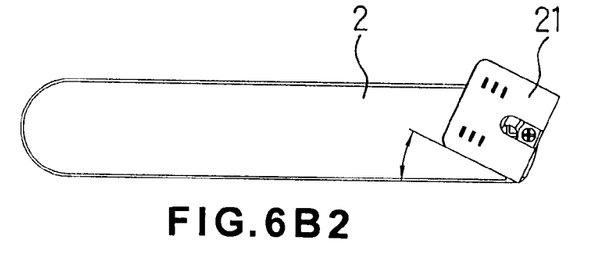
Figure 6C:
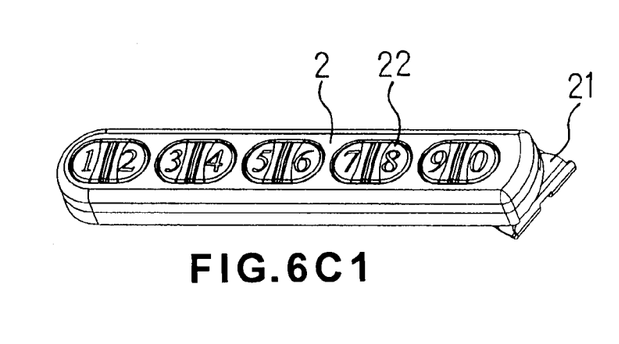
Figure 6C:
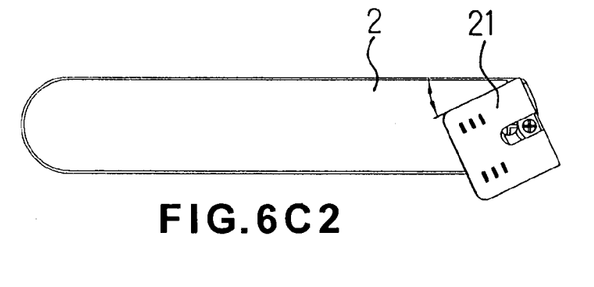

Please refer to FIGS. 6A1 and 6A2 that are front perspective and rear plan views, respectively, of a fourth embodiment of the wireless keypad 2. In the fourth embodiment, the clip 21 is pivotally turnable so as to be angularly adjustable relative to the car door 3, allowing the wireless keypad 2 to be mounted to different car doors 3 that have different door edge inclinations.

FIGS. 6B1 and 6B2 are front perspective and rear plan views, respectively, showing the clip 21 of the clip-on wireless keypad 2 in the fourth embodiment is turned leftward relative to the wireless keypad by an angle; and FIGS. 6C1 and 6C2 are front perspective and rear plan views, respectively, showing the clip 21 of the clip-on wireless keypad 2 in the fourth embodiment is turned rightward relative to the wireless keypad by an angle.

Figure 7:
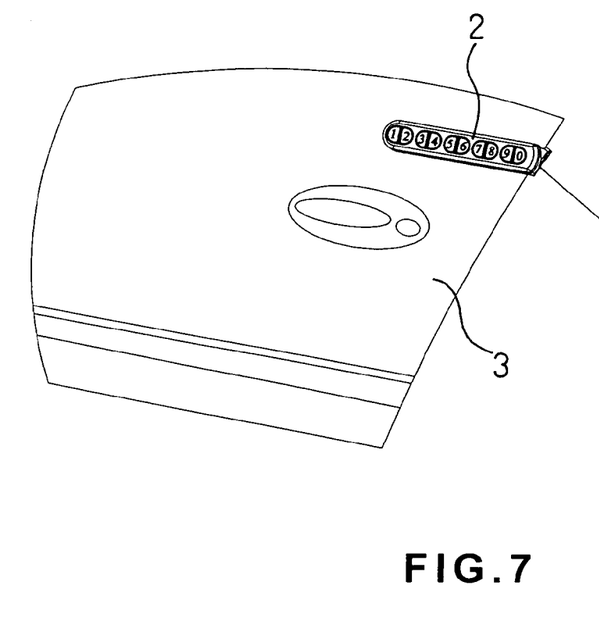
FIG. 7 shows the mounting of the clip-on wireless keypad of FIG. 6 to a car door edge.
Figure 7A:
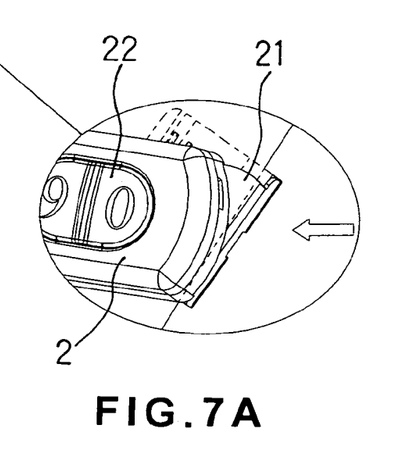
FIG. 7A is a partially enlarged view of FIG. 7.

FIGS. 7 and 7A shows the mounting of the clip-on wireless keypad of the fourth embodiment to a car door edge. As shown, with the turnable clip 21, the wireless keypad 2 may always be mounted to the car door 3 in parallel with a door handle or window frame thereof, so as to maintain the car door 3 in a beautiful and harmonious appearance.

The clip-on wireless keypad 2 together with the main controller 1 may form an antitheft system suitable for all versions of different brands of cars. With the clip-on wireless keypad 2 mounted on the car door 3, a user may conveniently press the predetermined numbered keys 22 to enter and transmit a code to the main controller 1 to release or enable the antitheft system of the present invention just beside the car. Therefore, the antitheft system with clip-on wireless keypad according to the present invention is a humanized design. That is, to enable the antitheft system and lock the car doors, the user needs only to press one or more predetermined keys 22 on the wireless keypad before he or she leaves the car. And, to release the antitheft system and unlock the car doors, the user needs only to press one or more correct number on the wireless keypad 2 just beside the car.

The present invention has been described with some preferred embodiments thereof and it is understood that many changes and modifications in the described embodiments can be carried out without departing from the scope and the spirit of the invention that is intended to be limited only by the appended claims.

What is claimed is:

1. An anti-theft system with clip-on wireless keypad, comprising a main controller and the wireless keypad; the main controller being mounted in a car for controlling an overall operation of the antitheft system and door locks of the car; and the wireless keypad being provided with a clip for connecting the wireless keypad to an edge of a door of the car, so that a user may press predetermined keys on the wireless keypad to enter and transmit a code signal to the main controller to release or enable the antitheft system; wherein the clip on the wireless keypad has a size larger than the gap between front and rear doors or the gap between the door and door frame, preventing the wireless keypad from being externally detached from the door edge once the car door is closed; and the wireless keypad works with the main controller to allow the user to release or enable the antitheft system just beside the car without the need of carrying a remote controller, making the antitheft system a humanized design.

2. The antitheft system with clip-on wireless keypad as claimed in claim 1, wherein the wireless keypad has an elongate body, and the keys and the clip of the wireless keypad are provided on a front and a rear side, respectively, of the elongate body.

3. The antitheft system with clip-on wireless keypad as claimed in claim 1, wherein the wireless keypad may be of any shape with the keys and the clip respectively provided on a front and a rear side thereof.

4. The antitheft system with clip-on wireless keypad as claimed in claim 1, wherein the clip is pivotally turnable to allow an angular adjustment of the clip relative to the wireless keypad, so that the wireless keypad may be mounted to car doors having different edge inclinations and always kept parallel with a door handle or window frame of the car door to maintain the car door in a beautiful and harmonious appearance.

* * * * *